(12) United States Patent
Hong et al.

(10) Patent No.: US 6,972,927 B2
(45) Date of Patent: Dec. 6, 2005

(54) FLANGED BREATHER FILTER CARTRIDGE WITH AN INTEGRATED DIFFUSION PATH

(75) Inventors: YiRen Hong, Singapore (SG); Quock Ying Ng, Singapore (SG); JingShi Goh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 110 days.

(21) Appl. No.: 10/670,042

(22) Filed: Sep. 24, 2003

(65) Prior Publication Data
US 2005/0063093 A1 Mar. 24, 2005

(51) Int. Cl.[7] .................. G11B 33/14; B01D 46/02; B01D 53/04; B01D 53/22
(52) U.S. Cl. ............... 360/97.02; 55/318; 55/385.9; 96/139
(58) Field of Search .................. 360/97.02, 97.03; 93/134, 139; 55/385.6, 318

(56) References Cited

U.S. PATENT DOCUMENTS

| | | |
|---|---|---|
| 5,229,899 A | 7/1993 | Brown et al. |
| 5,367,417 A | 11/1994 | Brown et al. |
| 5,417,743 A | 5/1995 | Dauber |
| 5,754,366 A | 5/1998 | Yoshino |
| 5,764,435 A | 6/1998 | Sugimoto et al. |
| 5,997,614 A | 12/1999 | Tuma et al. |
| 6,214,070 B1 | 4/2001 | Crowder et al. |
| 6,285,524 B1 | 9/2001 | Boigenzahn et al. |
| 6,296,691 B1 | 10/2001 | Gidumal |
| 6,475,269 B1 * | 11/2002 | Turner ............. 360/97.02 |
| 6,618,222 B1 * | 9/2003 | Watkins et al. ....... 360/97.02 |
| 6,824,595 B2 * | 11/2004 | Ueki et al. ............ 360/97.02 |

* cited by examiner

Primary Examiner—Craig A. Renner
(74) Attorney, Agent, or Firm—Jennifer M Buenzow

(57) ABSTRACT

A breather filter cartridge in a data storage device contains a filtration media, such as packed granular carbon, in a chamber. The cartridge incorporates a gas diffusion path that traverses through the breather filter casing, interfacing with the chamber along a tubular sidewall and allowing the thickness of the filter top end to be reduced. This permits additional filter media to be packed into the same breather filter height. Alternatively, the same amount of filtration media can accordingly be packed into a thinner breather filter. The top end may also include an outward extending flange, with the chamber extending completely through the flange. A thin film seals the media above the flange, allowing for even more filter media to be packed into a breather filter of identical height.

22 Claims, 4 Drawing Sheets

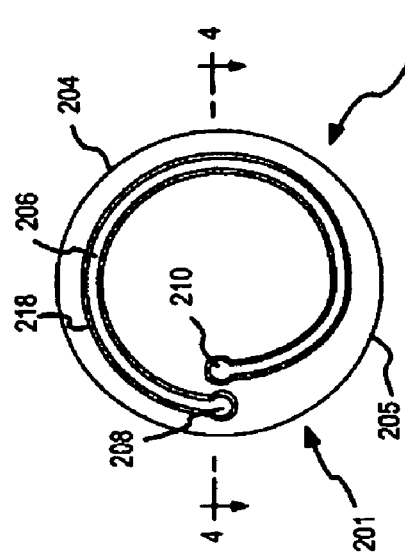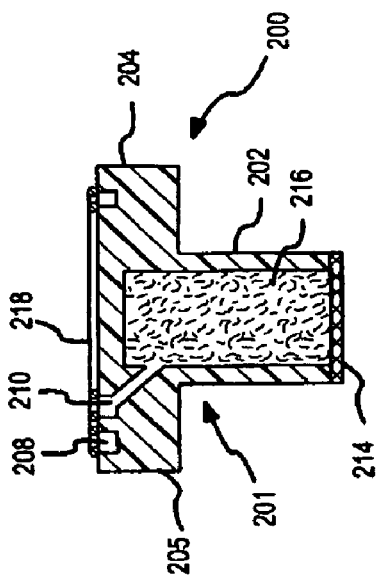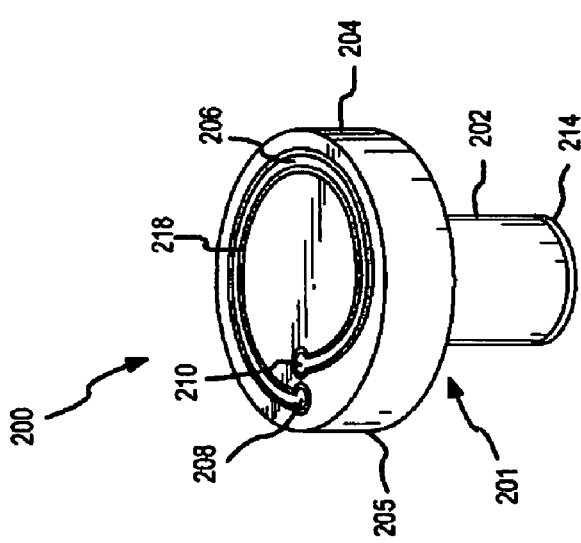

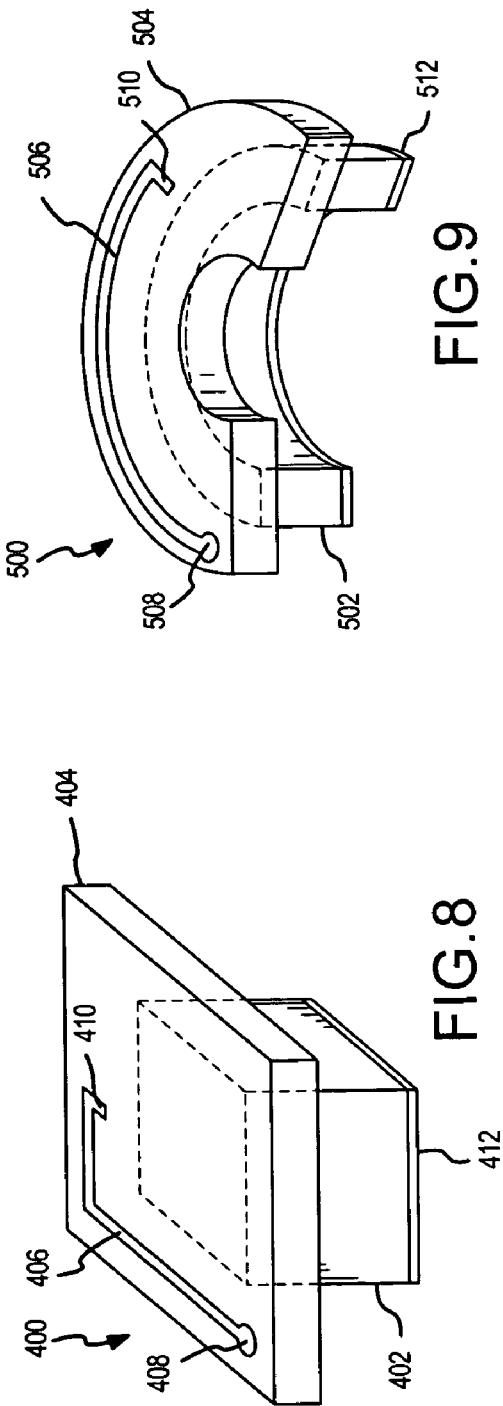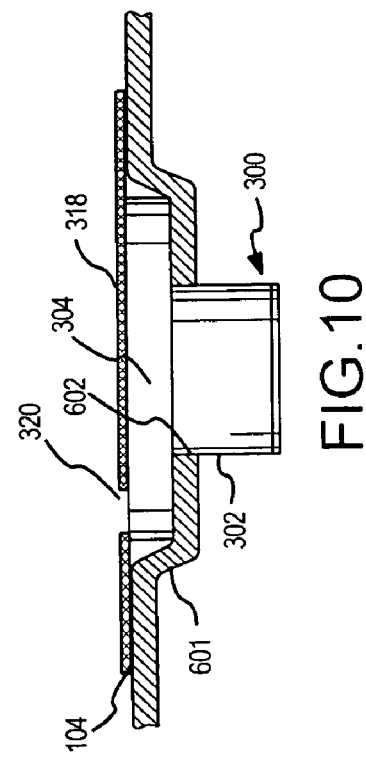

US 6,972,927 B2

FLANGED BREATHER FILTER CARTRIDGE WITH AN INTEGRATED DIFFUSION PATH

FIELD OF THE INVENTION

This invention relates to breather filters in data storage devices such as a disc drive and, in particular, to a breather filter cartridge that incorporates a gas diffusion path within its filter casing.

BACKGROUND OF THE INVENTION

Ever since the invention of the hard disc drive about fifty years ago, the physical sizes of these drives have shrunk considerably. The 5.25" diameter disc drive gave way to the 3.5" disc drive. Now the 2.5" diameter disc drive is well known and the 1.8" diameter disc drive is becoming increasingly prevalent in computer systems. As disc drives physical dimensions have been decreased, it is increasingly difficult to find enough space for breather filters that remove particulates from air entering the disc drive. The internal dimensions of modern disc drives are very thin, in some cases only about 9 mm in height, with an approximate 3 mm of height inside these drive housings for a breather filter cartridge.

Disc drives are sensitive to particulates and gaseous contaminants that interfere with normal electrical and mechanical operations within a disc drive. As pressure gradients naturally develop between the internal environment of the disc drive and the environment outside of the drive, air transfer therebetween occurs. Filtration is critical to ensure that any incoming airflow is cleansed of any gaseous contaminants and particulates that may be present. Breather filters align with a breather hole in the disc drive housing. The breather filter is aligned such that any air entering through the breather hole must traverse breather filter media before entering the internal environment of the disc drive. Carbon is a common medium; others include foam and woven polyester. Other filters are often also used inside the disc drive to filter particulates and contaminants generated within the disc drive.

One conventional breather filter design incorporates a plastic casing packed with granular carbon. The plastic breather filter casing integrates a diffusion path leading from a breather hole in the disc drive casing, through the top end of the plastic breather filter casing, and into packed granular carbon housed within the filter. Air traversing this diffusion path finally enters the internal environment of the disc drive after passing through the carbon chamber. The diffusion path interfaces with the carbon chamber through the top of the breather filter casing above the carbon chamber, requiring the top of the casing to have a thickness of approximately 1.5 mm. This 1.5 mm of thickness takes up valuable space especially as the internal height dimension requirement of disc drives continue to be decreased to 9 mm in height and below. Accordingly there is a need to pack additional carbon into existing breather filter cartridge dimensions. There is also a need to reduce the thickness of breather filter cartridge dimensions while maintaining the same amount of filtration.

SUMMARY OF THE INVENTION

Against this backdrop embodiments of the present invention have been developed. Embodiments of the present invention include a breather filter cartridge for use in data storage devices. These data storage devices receive benefit from the breather filters incorporated into embodiments of the present invention independent of the physical dimensions of these storage devices. Thus the present invention is not limited to a specific size or type of data storage device. One such device is a magnetic disc drive. One embodiment of the present invention is a disc drive that has a gas diffusion path incorporated into the breather filter cartridge. The gas diffusion path traverses through the breather filter casing, interfacing with the filter media chamber along a tubular sidewall rather than through the top end of the filter casing above the filter media chamber. Since the top end of the breather filter cartridge does not contain the interface between the gas diffusion path and the filter media chamber, the thickness of the breather filter top end can be reduced, permitting additional filter media to be packed into the breather filter without increasing the overall height of the breather filter cartridge.

In another embodiment of the present invention, the breather filter top end may have a flange extending outward from the tubular sidewall. This flange houses the gas diffusion path. Since the portion of the filter end directly above the filter media chamber no longer houses any part of the gas diffusion path, a thin film can be used above the filter media chamber. The filter media chamber and filter media thus can extend up completely through the flange. Using the thin film to seal the filter media chamber allows for even more filter media to be packed into the breather filter without increasing the overall height of the filter casing.

These and various other features, as well as advantages that characterize embodiments of the present invention, will be apparent from a reading of the following detailed description and a review of the associated drawings.

BRIEF DESCRIPTION OF THE DRAWINGS

FIG. 2 is a perspective view of the breather filter cartridge shown in FIG. 1 according to a first embodiment of the present invention.

FIG. 3 is a top plan view of the breather filter cartridge shown in FIG. 2.

FIG. 4 is a cross-sectional view of the breather filter cartridge shown in FIG. 3 taken along line 4—4.

FIG. 8 is a perspective view of a breather filter cartridge according to a third embodiment of the present invention.

FIG. 9 is a perspective view of a breather filter cartridge according to a fourth embodiment of the present invention.

FIG. 10 is a cross-sectional view of a disc drive cover according to a fourth embodiment of the present invention.

DETAILED DESCRIPTION

Figure 1:
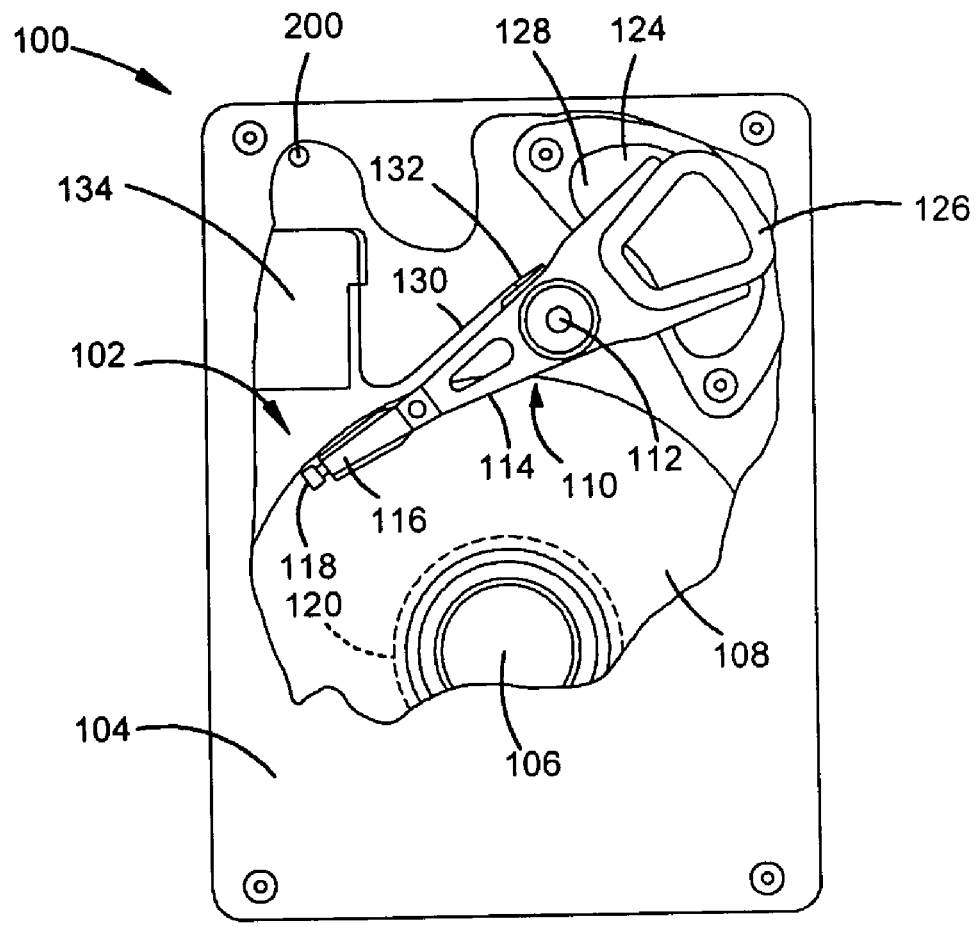
FIG. 1 is a plan view of a disc drive with its cover partially broken away to reveal the primary internal components and incorporating a preferred embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108. A breather filter cartridge 200 adjacent to the actuator assembly 110 permits gas pressure equalization between an external environment and the internal, sealed environment.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base 102 to a disc drive printed circuit board (not shown) mounted to the bottom side of the disc drive 100.

FIG. 2 is a perspective view of the breather filter cartridge shown in FIG. 1 according to a first embodiment of the present invention. FIG. 3 is a top plan view of this embodiment of the breather filter cartridge. FIG. 4 is a cross-sectional view of the breather filter cartridge shown in FIG. 3 taken along line 44.

The breather filter cartridge 200 has a tubular sidewall 202. The tubular sidewall 202 has a horizontal cross section in the shape of a circular ring. The tubular sidewall 202 may take other shapes based on a variety of factors including the shape of available space within the tight confines of data storage devices, such as disc drives, and various manufacturing concerns. The tubular sidewall 202 is capped at one end by a top end 204 and at the other end by a bottom end 214. The top end 204 includes a flange 205 extending outwardly around the tubular sidewall portion as shown in FIG. 4. This flange 205 may provide additional surface area for the top end to be fastened to either the base 102 or the top cover 104 of the disc drive 100. The flange 205 may or may not have a horizontal cross section identical in shape to the cross section of the tubular sidewall 202, again depending on a variety of factors such as the space available within the disc drive 100 housing. In other embodiments, the top end 204 simply caps the tubular sidewall 202.

The tubular sidewall 202, top end 204, and bottom end 214 together form a cartridge casing 201 defining a filter media chamber 216 in the cartridge 200. The filter media chamber 216 houses filtration media that can remove chemical vapors, corrosive gases, particulates, or some combination of these, from gases entering the disc drive 100 as a result of equalizing gas pressure between an external environment and the internal environment of the data storage device. In a preferred embodiment of the present invention, this filtration media is composed of packed granular carbon. The bottom end 214 preferably has a sheet of permeable material such as a gas permeable film over the bottom of the filter media chamber 216. One such film is a polytetrafluoroethylene (PTFE) membrane. The use of a PTFE membrane as the bottom end 214 gas permeable film allows the bottom end 214 to both retain the filtration media within the filter media chamber 216 and filter particulates from any air entering the disc drive 100 through the filter cartridge 200. In a preferred embodiment of the present invention, the filter media chamber 216 may extend into the top end 204, as shown in FIG. 4.

A gas diffusion path 206 traverses through the breather filter into the chamber 216. This gas diffusion path 206 may be an open channel formed in the top surface of the top end 204, a hollow passage or bore drilled through the breather filter casing 201, or some combination of these. The gas diffusion path 206 begins at a starting location 208 adjacent the top edge of the top end 204. The filter 200 is positioned in the disc drive 100 such that the starting location 208 is aligned with and seals a breather hole in the disc drive 100 housing, preferably in either the disc drive base 102 or the disc drive top cover 104. A thread-like seal 218 may be present, following around the edges of the gas diffusion path 206 on the top end 204, sealing the breather hole and diffusion path 206 from the internal environment of the disc drive 100. This thread-like seal 218 preferably has an adhesive component suitable for bonding the breather filter cartridge 200 to the disc drive housing 100. Gases entering through the breather hole follow the gas diffusion path 206 to reach the internal environment of the disc drive 100. The gas diffusion path 206 traverses to ending location 210 at the filter media chamber 216 along the tubular sidewall portion 202. The term "along" as used in the context of the path-to-chamber interface according to embodiments of the present invention means that the path for gases to enter the filter media chamber 216 passes through either a tubular sidewall 202 inner surface into the chamber 216, or through the top end 204 into the chamber 216 immediately adjacent the sidewall 202. Both interpretations allow for a substantially reduced top end thickness compared to conventional breather filter cartridge designs.

In a preferred embodiment of the present invention, the gas diffusion path 206 begins on the flange 205 of the top end 204, spirals around the flange 205 approximately three hundred sixty degrees, at no point crossing directly above the filter media chamber 216, thereby providing a tortuous path for entering gases. In an alternative embodiment, the gas diffusion path 206 may extend less than 360 degrees around the top end 204 or may cross over the filter media chamber 216 but still enters the filter media chamber 216 along the tubular sidewall 202 adjacent an upper end thereof. In yet another embodiment of the present invention, the top end 204 does not have a flange 205. Instead, the diffusion path is a hollow bore spiraling around and down through the tubular sidewall 202 before entering the filter media chamber 216 along the tubular sidewall 202.

Because of the change in path-to-chamber interface location identified in the various embodiments of the present invention above described, the thickness of the top end 204 of the breather filter cartridge 200 can be reduced from about 1.5 mm to about 0.75 mm (compared to a conventional filter cartridge) since the top of the casing 201 no longer houses the path-to-chamber interface above the chamber. This 0.75 mm decrease in top end 204 thickness is very important in small form factor drives, such as 2.5" disc drives with a 9 mm vertical dimension inside the disc drive assembly. In a breather filter design that is 3.0 mm high, the prior art designs have 1.5 mm of height within the filter for holding the filtration media. The present invention, shown in FIGS. 2–4, has about 0.75 mm of thickness in the top of the breather filter cartridge leaving about 2.25 mm of height in the chamber. Thus with this embodiment approximately 50 percent more filtration media can be stored within the filter without increasing the filter's external physical dimensions.

Figure 6:
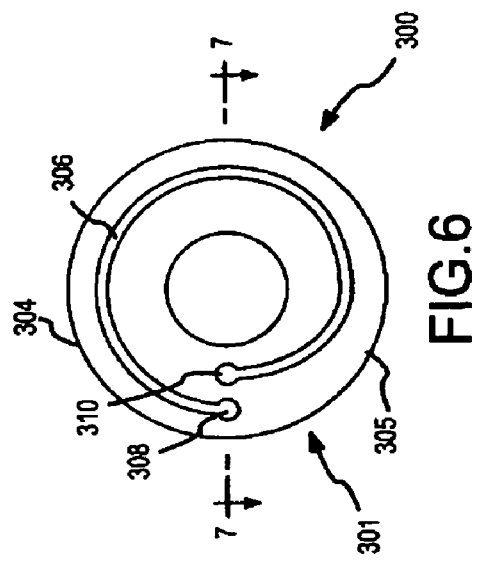
FIG. 6 is a top plan view of the breather filter cartridge shown in FIG. 5 with the top film removed.
Figure 7:
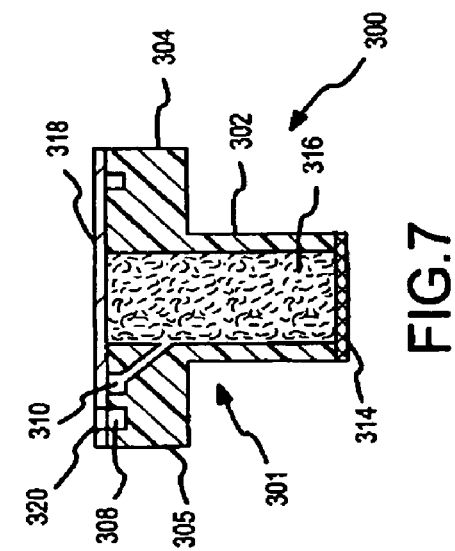
FIG. 7 is a cross-sectional view of the breather filter cartridge shown in FIG. 6, with the top film in place, taken along line 7—7.
Figure 5:
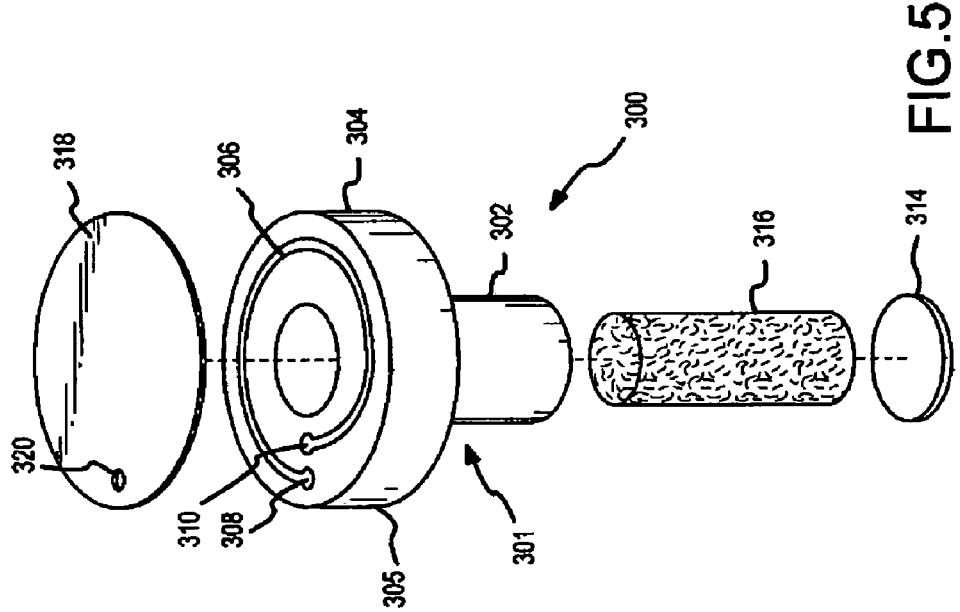
FIG. 5 is an exploded perspective view of a breather filter cartridge according to a second embodiment of the present invention.

FIG. 5 is an exploded perspective view of a breather filter cartridge 300 according to a second embodiment of the present invention. FIG. 6 is a top plan view of the breather filter cartridge 300 shown in FIG. 5 with a top film removed. FIG. 7 is a cross-sectional view of the breather filter cartridge shown in FIG. 6, but with the top film in place, taken along line 7—7. The breather filter cartridge 300 has a tubular sidewall 302. In a preferred embodiment the tubular sidewall 302 has a horizontal cross section in the shape of a circular ring. The tubular sidewall 302 may take other shapes based on a variety of factors including the shape of available space within the tight confines of data storage devices, such as disc drives, and various manufacturing concerns well known to those in the art. The tubular sidewall 302 is capped at one end by a top end 304 and at the other end by a bottom end 314. The top end 304 includes a flange 305 extending outwardly around the tubular sidewall portion as shown in FIG. 7. This flange 305 may provide additional surface area for the top end to be fastened to either the base 102 or the top cover 104 of the disc drive 100. The flange 305 may or may not have a horizontal cross section identical in shape to the cross section of the tubular sidewall 302, again depending on a variety of factors such as the space available within the disc drive housing. In other embodiments, the top end 304 simply caps the tubular sidewall 302.

The tubular sidewall 302, top end 304, and bottom end 314 together form a cartridge casing 301 defining a filter media chamber 316. The filter media chamber 316 houses filtration media that can remove chemical vapors, corrosive gases, particulates, or some combination of these, from gases entering the disc drive 100 as a result of equalizing gas pressure between an external environment and the internal environment of the data storage device. In a preferred embodiment of the present invention, this filtration media is composed of packed granular carbon. Other filtration media are also within the scope of the present invention. The bottom end 314 preferably has a sheet of permeable material such as a gas permeable film over the bottom of the filter media chamber 316. One such film is a polytetrafluoroethylene (PTFE) membrane. The use of a PTFE membrane as the bottom end 314 gas permeable film allows the bottom end 314 to both retain the filtration media within the filter media chamber 316 and filter particulates from any air entering the disc drive 100 through the filter cartridge 300. A preferred embodiment has a hollow top end 304 wherein the filter media chamber 316 extends completely through the middle of the top end 304. The filter media chamber 316 is then sealed by a top film 318.

In one embodiment, the film 318 is air impermeable, and air enters gas diffusion path 306 through a small hole 320 in the top film 318 that is aligned with an opening in the disc drive 100. In other embodiments of the present invention, the top film 318 is gas permeable and the small hole 320 may or may not be present. In still another embodiment of the present invention, the top film 318 extends over the filter media chamber 316 but does not extend to the peripheral edge of the top end 304. In yet another embodiment of the present invention, a thread-like seal follows the edges of the gas diffusion path 306 along the top end 304 similar to the thread-like seal 218 of FIGS. 2–4, sealing the breather hole and diffusion path 306 from the internal environment of the disc drive 100. This thread-like seal preferably has an adhesive component suitable for bonding the breather filter cartridge 300 to the disc drive housing 100. The top film 318 may alternatively have an adhesive component suitable for attaching the breather filter cartridge 300 to the disc drive base 102 or the disc drive top cover 104. The bottom end 314 is preferably a gas permeable film sealing the bottom of the filter media chamber 316.

The cartridge 300 has a gas diffusion path 306 formed in the breather filter casing 301. This gas diffusion path 306 may be an open channel carved into the top surface of the top end 304, a curved hollow passage or bore drilled through the breather filter casing 301, or some combination of these. The gas diffusion path 306 begins at a starting location 308 adjacent the peripheral edge of the top end 304. The path starting location 308 of the gas diffusion path 306 is aligned with a breather hole in the disc drive 100 housing, preferably either the disc drive base 102 or the disc drive top cover 104. Gases entering through the breather hole follow the gas diffusion path 306 to reach the internal environment of the disc drive 100. The gas diffusion path 306 traverses through the breather filter casing 301, to ending location 310 entering the filter media chamber 316 along the tubular sidewall portion 302 adjacent an upper end thereof. The term "along" as used in the context of the path-to-chamber interface according to embodiments of the present invention, can mean that gases enter the filter media chamber 316 through a tubular sidewall 302 inner surface, or through the top end 304 of the filter casing 301 adjacent a tubular sidewall 302 surface.

In a preferred embodiment of the present invention, the gas diffusion path 306 begins along the flange 305 of the top end 304, spirals around the flange 305 approximately three hundred sixty degrees, at no point crossing directly above the filter media chamber 316, thereby providing a tortuous path for entering gases. Paths of lesser or greater length are also within the scope of the present invention. In an alternative embodiment, the gas diffusion path 306 crosses over the upper end of the filter media chamber 316 but still terminates at the filter media chamber 316 along the tubular sidewall 302 adjacent an upper end thereof. In yet another embodiment of the present invention, the top end 304 does not have a flange 305 and the diffusion path is fully formed within the sidewall 302. In this case, the path is a hollow passage of arbitrary cross section spiraling down through the tubular sidewall 302 before entering the filter media chamber 316 along the tubular sidewall 302.

While the gas diffusion path 306 is preferably noted as having a starting location 308 on the top end 306 and an ending location 310 at the filter media chamber 316, one skilled in the art will appreciate that gas may flow in either direction depending on the pressure differential.

Because of the path-to-chamber interface location identified in the various embodiments of the present invention and the use of a thin top film 318, the thickness of the top end 304 of the breather filter cartridge 300 can be reduced from about 1.5 mm to about 0.1 mm since the path-to-chamber interface is located elsewhere. This 1.4 mm decrease in filter thickness is important in small form factor drives, such as 2.5" disc drives with an approximate 9 mm vertical dimension inside the disc drive assembly. With the improvement from embodiments of the present invention, 0.1 mm of thickness in the top of the breather filter cartridge leaves about 2.9 mm of height. Approximately 95 percent more filtration media can be stored within the filter without increasing the filter's external physical dimensions with this improvement.

In FIG. 8, a breather filter cartridge 400 has a tubular sidewall portion 402 that has a rectangular tubular horizontal cross section, sealed underneath by bottom end 412. Top end 404 also has a rectangular horizontal cross section. Gas diffusion path 406, with a starting location 408 and an ending location 410, traverses along an outer periphery of top end 404.

In FIG. 9, a breather filter cartridge 500 has a tubular sidewall portion 502 that has an arcuate tubular horizontal cross section, sealed underneath by bottom end 512. Top end 504 also has an arcuate horizontal cross section. Gas diffusion path 506, with a starting location 508 and an ending location 510, traverses along an outer periphery of top end 504.

In FIG. 10, an alternative embodiment of affixing the breather filter cartridge 300 to the disc drive cover 104 is shown, affixing the cartridge top end 304 within a stamped or molded depression 601 in the disc drive cover 104. The breather filter cartridge tubular sidewall 302 extends into the internal environment of the disc drive through an aperture 602 in the disc drive cover 104. The top film 318, with a small hole 320, seals the top of the breather filter cartridge 300. Gases enter the cartridge 300 through the gas diffusion path 306, shown in FIGS. 5–7. The top film 318 may serve multiple functions, for example the top film 318 could be a standard, rectangular-shaped disc drive label adhesively bonded to the outside of the disc drive top cover 104 with a small hole 320 in the label located above the breather filter cartridge 300 at the starting location 308 of the diffusion path 306. The top film 318 might alternatively be a disc shaped film used solely for the purpose of sealing the filter 300 as shown in FIGS. 5–7. Alternatively, the cartridges 200, 400, or 500 of FIGS. 24, 8, or 9 could be used in place of the cartridge shown in FIG. 10, with the top film 318 of FIG. 10 used to seal the diffusion path 306 in the top of the breather filter cartridge. Positioning the breather filter cartridge 300 as in FIG. 10 can save additional space as compared to bonding the breather filter cartridge to an internal surface of the disc drive 100 housing.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the shapes and sizes of the filter elements could be altered to maintain similar functionality and still be within the scope of the present invention, as shown in a third and fourth embodiment of the present invention depicted in FIG. 8 and FIG. 9.

Numerous other changes may be made which will readily suggest themselves to those skilled in the art and which are encompassed in the spirit of the invention disclosed and as defined in the appended claims.

What is claimed is:

1. A breather filter cartridge comprising:
a body having a tubular sidewall portion and an end portion at one end of the tubular sidewall portion, the end portion having a flange extending outwardly around the tubular sidewall portion, where the tubular sidewall portion and the end portion define a chamber for containing a filter media, wherein the end portion has a diffusion path formed within the flange interfacing with the chamber along the tubular sidewall portion.

2. The breather filter cartridge of claim 1 further comprising a film positioned on the end portion.

3. The breather filter cartridge of claim 2 wherein the film is a gas permeable film.

4. The breather filter cartridge of claim 1 wherein the diffusion path formed in the end portion extends around the tubular sidewall portion.

5. The breather filter cartridge of claim 4 wherein the diffusion path spirals around the flange about three hundred sixty degrees without crossing the chamber.

6. The breather filter cartridge of claim 4 wherein the diffusion path extends less than three hundred sixty degrees and enters the chamber along the tubular sidewall portion adjacent an upper end portion.

7. The breather filter cartridge of claim 1 further comprising a gas permeable film over an opposite end portion of the tubular sidewall portion.

8. The breather filter cartridge of claim 1 wherein the chamber extends through the end portion.

9. In a data storage device having a base and a cover forming a clean internal environment therein, a breather filter cartridge permitting gas pressure equalization between an external environment and the internal environment, the breather filter cartridge comprising:
a body having a tubular sidewall portion and an end portion with a flange extending outwardly around the tubular sidewall portion at one end of the tubular sidewall portion together defining a chamber for containing a filter media, wherein the end portion has a diffusion path formed within the flange therein interfacing with the chamber along the tubular sidewall portion.

10. The breather filter cartridge of claim 9 further comprising a film positioned on the end portion.

11. The breather filter cartridge of claim 10 wherein the film is a gas permeable film.

12. The breather filter cartridge of claim 9 wherein the diffusion path formed in the end portion extends around the tubular sidewall portion.

13. The breather filter cartridge of claim 12 wherein the diffusion path spirals around the flange about three hundred sixty degrees without crossing the chamber.

14. The breather filter cartridge of claim 12 wherein the diffusion path extends less than three hundred sixty degrees and enters the chamber along the tubular sidewall portion adjacent an upper end portion.

15. The breather filter cartridge of claim 9 further comprising a gas permeable film over an opposite end portion of the tubular sidewall portion.

16. The breather filter cartridge of claim 9 wherein the chamber extends through the end portion.

17. In a data storage device having a base and a cover forming a clean internal environment therein, a breather filter cartridge comprising:
- a body having a tubular sidewall portion and an end portion at one end of the tubular sidewall portion, the end portion having a flange extending outwardly around the tubular sidewall portion, the tubular sidewall portion and the end portion together defining a chamber for containing a filter media, wherein the end portion has a diffusion path formed within the flange interfacing with the chamber along the tubular sidewall portion; and
- a means for equalizing gas pressure between an external environment and the internal environment of the data storage device by providing a diffusion path for gas to pass through the end portion of the breather filter cartridge to and from the chamber along the tubular sidewall portion.

18. The breather filter cartridge of claim 17 further comprising a film positioned on the end portion.

19. The breather filter cartridge of claim 18 wherein the film is a gas permeable film.

20. The breather filter cartridge of claim 17 wherein the means for equalizing gas pressure is formed in the end portion and extends around the tubular sidewall portion.

21. The breather filter cartridge of claim 17 further comprising a gas permeable film over an opposite end portion of the tubular sidewall portion.

22. The breather filter cartridge of claim 17 wherein the chamber extends through the end portion.

* * * * *